Jan. 19, 1954
H. A. BING
2,666,375
FILM METERING TAPE CONTROL SYSTEM FOR CAMERA FILM WINDS
Filed March 28, 1951
3 Sheets-Sheet 1
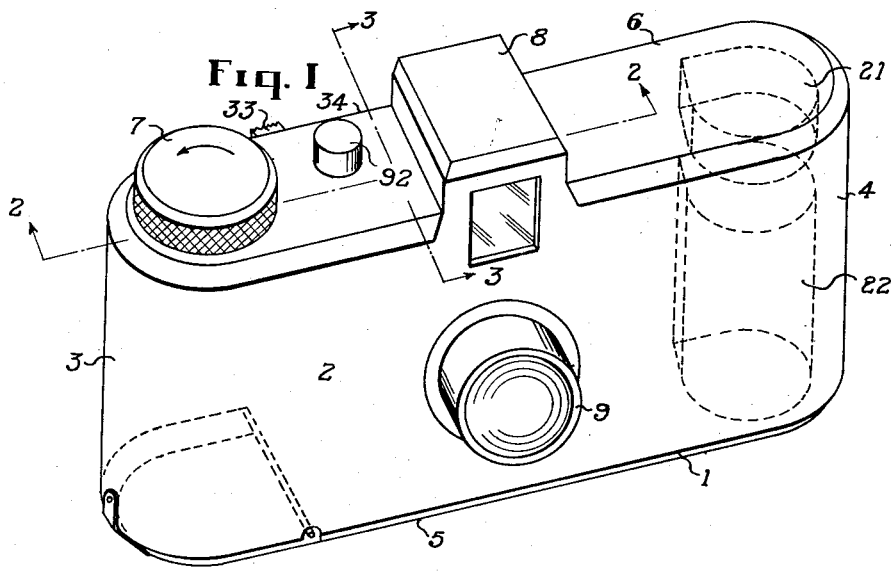
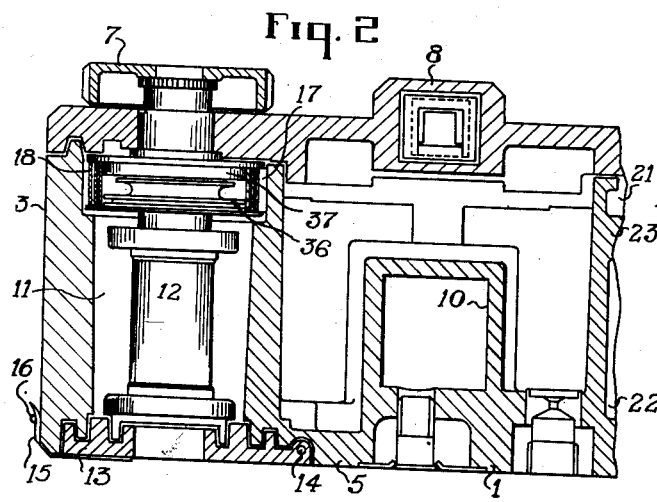
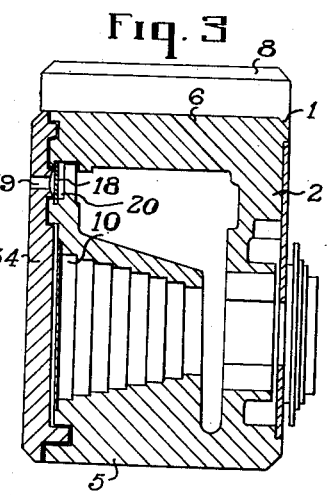
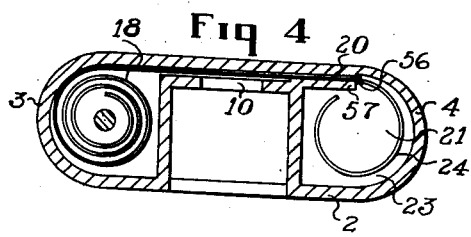
HERBERT A. BING
*INVENTOR.*
BY Daniel J. Mayne
ATTORNEYS Jan. 19, 1954
H. A. BING
2,666,375
FILM METERING TAPE CONTROL SYSTEM FOR CAMERA FILM WINDS
Filed March 28, 1951
3 Sheets-Sheet 2
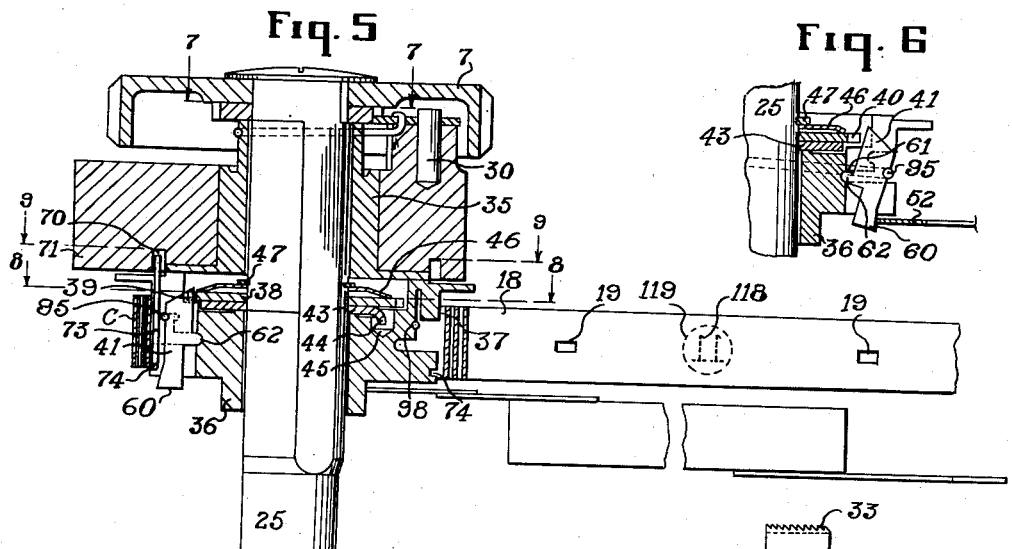
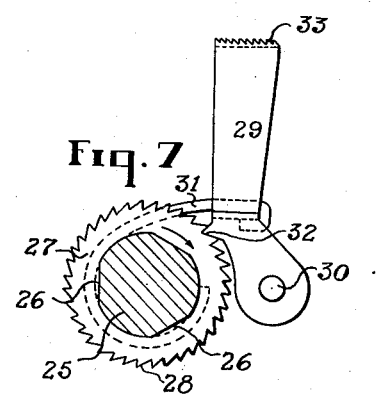
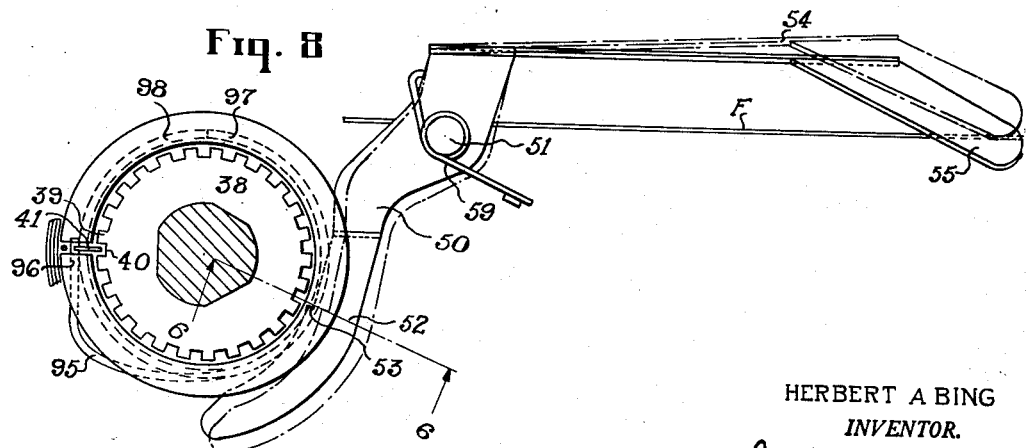
HERBERT A BING
INVENTOR.
BY
ATTORNEYS Jan. 19, 1954        H. A. BING        2,666,375
FILM METERING TAPE CONTROL SYSTEM FOR CAMERA FILM WINDS
Filed March 28, 1951        3 Sheets-Sheet 3
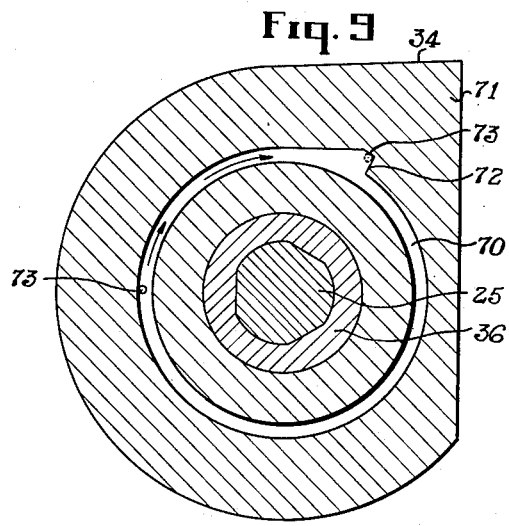
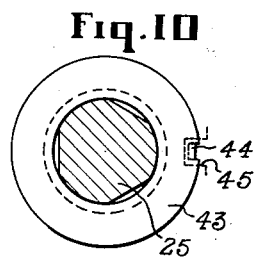
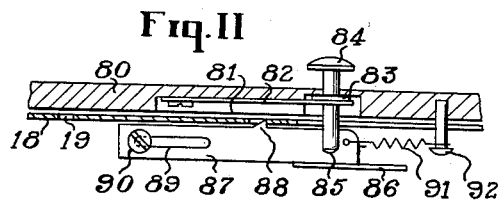
HERBERT A. BING
INVENTOR.
BY Daniel J. Mayne
Donald H. Stewart
ATTORNEYS Patented Jan. 19, 1954

2,666,375

UNITED STATES PATENT OFFICE 2,663,375

FILM METERING TAPE CONTROL SYSTEM FOR CAMERA FILM WINDS

Herbert A. Bing, Wellesley, Mass., assignor to Eastman Kodak Company, Rochester, N. Y., a corporation of New Jersey Application March 28, 1951, Serial No. 218,009

15 Claims. (Cl. 95—31)

This invention relates to photography and more particularly to a control system for photographic cameras by which movement of film from a supply chamber into a take-up chamber and back onto the original spool in the supply chamber may be accurately controlled. Another object of my invention is to provide a camera in which double exposures are prevented. Still another object of my invention is to provide a film winding mechanism control by which movement of the film may be mechanically controlled in moving in two directions, and by which the film moving in one direction may be automatically measured for exposure. A still further object of my invention is to provide a metal tape film measuring means, and to provide a means for clutching and unclutching tape from a film winding shaft to synchronize movement of the film winding shaft with the tape. A still further object of my invention is to provide a control for winding the film in two directions and for controlling the position of the film without imposing any load on the film itself. Other objects will appear from the following specification, the novel features being particularly pointed out in the claims at the end thereof.

Coming now to the drawings in which like reference characters denote like parts throughout, Figure 1 is a perspective view of a camera which may be equipped with a film metering tape control constructed in accordance with and embodying a preferred form of my invention.

Figure 2 is a fragmentary detail sectional view taken on line 2—2 of Figure 1.

Figure 3 is a transverse sectional view taken on line 3—3 of Figure 1, certain parts being shown in elevation.

Figure 4 is a schematic sectional view showing the perforated control tape in its rest position as it will appear after a film has been completely exposed and rewound onto the original spool.

Figure 5 is an enlarged transverse sectional view through the key winding post and showing the control mechanism, parts being shown in elevation.

Figure 6 is a fragmentary detail partially in section, showing a latching device in its unlatching position, for holding the tape winding sheave so as to rotate with the winding key post.

Figure 7 is a fragmentary detail partially in section showing a one-way clutch for the winding key.

Figure 8 is a fragmentary detail showing a film-operated latch adapted to engage a latching pawl and designed to control the relative movement of the perforated tape sheave and the film-winding key post.

Figure 9 is a fragmentary sectional view of a portion of the control mechanism.

Figure 10 is a fragmentary sectional view showing a portion of a clutch mechanism.

Figure 11 is a fragmentary detail section showing a form of a tape engaging latch which may be used in accordance with my invention.

In cameras of the so-called "extrusion-loading" type, film carried on a film spool may be placed on a winding key shaft. This shaft may be turned in one direction to extrude, or move the film to a take-up chamber, after which the direction of movement of the winding key may be reversed and the film may be returned to the spool, intermittently exposing film areas as they are wound back past an exposure aperture. In the past, such winding apparatus has been subject to the difficulty that if the film winding knob was turned too far in an unwinding direction, film would reverse itself and start to wind back upon the original spool, thus causing improper winding and improper spacing of the film area.

My invention is particularly directed to overcome such difficulties and to provide a control system by which the unwinding and the winding up of film can be precisely controlled. More specifically, my invention is particularly directed to the construction of a winding key post and to a means for clutching and unclutching the key post to a sheave to which one end of a spring metal tape is attached, and to thereby control the movement of the key post and thus the film.

Figure 1 shows a typical camera which may include a preferred embodiment of my invention. The camera 1 may include a front wall 2 and curved end walls 3 and 4. There may be the usual bottom wall 5 and top wall 6. Winding key or knob 7 is provided for moving the film, and by turning this knob in the direction shown by the arrow in Figure 1, film may be wound upon a spool as exposures are made. The camera may include the usual finder 8 and objective 9. This objective is aligned with an exposure aperture 10, best shown in Figures 2 and 3. The curved wall 3 forms a portion of a spool chamber 11, into which film wound on a spool 12 may be placed by swinging a door 13 on the bottom wall 5 of the camera open and about its hinge 14, by which it is connected to the camera body 1. A springing latch 15, engaging a pin 16, may serve to hold this door closed during normal operation of the camera.

The spool chamber 11 lies directly beneath a tape chamber 17, in which there may be a coil of spring metal tape 18, as shown in Figure 4. This tape is perforated at intervals at 19, as best shown in Figure 5, and these perforations are used to control the amount of film wound for each exposure area. The tape may also have numerals 118, which may be viewed through a window 119 to determine the exposure area in place.

From the chamber 17, the tape 18 passes through a guideway 20, as shown in Figure 3, this guideway extending over to a tape chamber 21, which is coaxially arranged with respect to the film chamber 22, into which a loose coil of film may be wound from the film spool 12. There is a wall 23 shown in Figure 2 between tape chamber 21 and the spool chamber 22, so that loose coil 24 of tape may lie on this wall as the tape is propelled into this chamber by turning the knob 7 in a direction opposite to that of the arrow in Figure 1. In order to prevent the winding key post 25 and the winding knob 7 from turning in an unwinding direction to extrude film into chamber 22, I prefer the one-way clutch mechanism shown in Figure 7. The winding key post 25 is provided with a series of flat surfaces 26 on which a washer 27 is placed, having corresponding configurations and ratchet teeth 28. A pawl 29 is pivoted at 30 to the camera body 1, and a spring 31 normally holds a tooth of this pawl in engagement with the ratchet and thereby prevents the winding key post 25 from being moved in the direction shown by the arrow of Figure 7. However, since the handle 33 of the pawl projects from the camera back 34, as indicated in Figure 1, the pawl may be manually held away from its latching position, and when this is done, the winding knob 7 may extrude the film and the tape into loose coils in their respective chambers 21 and 22. When the handle 33 is released, it will be positioned to allow the winding knob 7 to turn only in a reverse direction.

The winding key shaft passes through a suitable bearing 35 in the top wall 34 of the camera, and the shaft 25 may turn freely in this bearing. There is a sheave 36 mounted to turn freely on the shaft 25 except when otherwise held in position, as will be pointed out hereinafter. This sheave includes an outer wall 37, over which convolutions of tape 18 may be wound.

In order to normally hold the sheave to the winding key post 25, there is a notched disk 38 which has a series of teeth 39 extending around its periphery so that in the notches 40, between these teeth, there is room for a pawl 41, shown in Figures 5 and 6, to either engage a notch 40 to definitely turn the sheave 36 with the shaft 25, or to release the notched disk 39, as shown in Figure 6. When so released, the sheave 36 may be turned by the friction which consists of a washer 43 with a downwardly turned lug 44 which projects into an opening 45 in the sheave. This washer is pressed downwardly by a spring washer 46, held by a snap ring 47 on the shaft 25. Referring to Figure 10, the lug 44 of the washer lies in a notch 45 in the sheave, the purpose of this being to prevent side pressure between a tooth 39 and the pawl 41 from being so great that the pawl will not readily release the notched disk 38 at the proper time.

When there is no film in the camera, it is desirable to prevent the sheave 36 from being turned a sufficient distance to get the perforated tape out of position with a film which may be later loaded into the camera. In order to accomplish this, I provide a tape latching member 50, which may be pivoted at 51 to the camera, and which includes an arm 52 having a stop 53 thereon and an arm 54 from which a film engaging member 55 projects into the path of film F. As indicated in Figure 8, if a film is not in place, this arm lies in the full line position in which the hook 53 is in an operative position. On the other hand, if a film is being passed through the camera, the film engaging arm 55 will be lifted and a hook will be moved to an inactive position. The metal tape 18 is of the type which, when released, tends to coil itself up and consequently, when the tape is passed through the guideway 20, it tends to curl just as soon as it passes out of this guideway, as indicated in Figure 4. However, when the tape is completely wound into the supply chamber 17, a stud 56 may strike a projection 57 on the camera's body and thus definitely halt further movement of the tape. Also, as the film F passes the arm 55, a suitable spring 59, as shown in Figure 8, may turn the latching arm 52 from its inoperative to its operative position so that the winding knob 7 may turn the key shaft 25 until the bottom of the pawl 41 is engaged by the stop 53 of arm 52 and consequently turns it upon the protuberance 61, which lies in a groove 62 in the sheave to disengage the pawl 41 from the notched disk 38. Further movement of the winding knob 7, therefore, does not affect the position of the sheave 36, and the tape 18 will remain in the Figure 4 position. The pawl 41 is held in engagement with a notch 40 by means of a spring 95, which has one end, 96, engaging the pawl, as shown in Figure 8, and the opposite end, 97, partially encircling the sheave 36 and lying in a slot 98 therein. The end of the tape is connected to the sheave 36 so that it can only be moved when the sheave is moved.

It is necessary to halt the extrusion winding movement of the winding knob—that is, turning this knob in a clockwise direction with respect to Figure 1. To accomplish this, there is a latching arrangement which consists of annular groove 70 in the upper wall 71 of the camera. This groove includes an offset notch 72. When convolution C of the tape 18 causes tape to be wound on the sheave 36, an upstanding arm 73 of a spring stop member is engaged, which spring normally lies in a groove 74 in the sheave and extends at least partially around it. When the convolutions C of the tape 18 engage the upstanding arm 73, the end thereof may ride freely in the groove 70 and may continue to turn until the last convolution leaves the sheave, therefore permitting the spring stop 73 to move outwardly, and, as soon as the notch 72 is reached, into the notch. When this occurs, the unwinding movement of the knob 7 must stop because the spring end 73 comes to a stop against the end 72 of the notch. This limits the unwinding movement of the winding handle and thus notifies an operator that the extrusion is complete so that the handle 33 of the one-way pawl can be released to thereafter eliminate the unwinding movement of the knob 7, even though the film may be partially returned to the supply chamber 11.

After the film has been completely extruded, it may be wound back, exposing the film as it is moved past the exposure aperture 10. In Figure 11 I have shown a simple type of mechanism for halting the movement of the tape each time an aperture 19 is engaged so that an exposure can be made. In this view, the rear wall 80 of the camera may be provided with a notch 81 in which a spring 82 lies, this spring normally pressing a collar 83 of a release plunger 84 outwardly, as shown in Figure 11. The end 85 of this plunger may lie over a flange 86 of a sliding stop pawl 87, having a tooth 88, normally lying in the path of a notch 19 in the control tape 18. As the winding knob 7 is turned in the direction shown by the arrow in Figure 1, each time a notch 19 is engaged by the tooth 88, the pawl 87 slides because of the slot 87 and the pin 90, while the tension on the spring 91, attached to the pawl 87 and a support 92, is increased. The tension on this spring will increase, and when the end of the slot 89 reaches the stud 90, the pawl will come to a halt and thereby stop the movement of the tape as well as the film. At this time, the operator may make an exposure by operating the usual type of trigger 92 on the top wall 6 of the camera. After this exposure is made, a push button 84 may be momentarily depressed, releasing the tooth 88 from the aperture 19 so that the pawl then slides by reason of the spring 91 along the tape, where it will lie in position to engage an aperture when the film is again wound. The mechanism shown in Figure 11 is a simple one which satisfactorily halts the movement of the film, but it is also possible to substitute for this arrangement a completely automatic arrangement which automatically stops the film, winds the shutter, and is automatically released after an exposure is made, such as the mechanism shown in the co-pending application, Serial No. 214,959, filed March 10, 1951, entitled Tape Control Camera Shutter and Release in the name of Joseph Mihalyi, now Patent Number 2,629,302, issued February 24, 1953.

The operation of this camera is substantially foolproof and is quite simple. Assuming that there is no film in the camera, the latch 15—16 may be released, the door 13 opened, and a film spool 12, with convolutions of film thereon, may be inserted so that configurations of the film spool will engage complementary configurations on the winding key shaft so as to be driven thereby. The door 13 may then be closed. The operator can move the handle 33, releasing the one-way clutch pawl 32 from the ratchet wheel 28. Knob 7 may now be turned to extrude the film and tape into the take-up chambers 21 ad 22, and when the last convolution C of the metal tape leaves the spring stop arm 74, this may move radially into the stop notch 72 and definitely halt the unwinding movement before all of the film leaves the film spool hub. When no further unwinding movement can take place, the handle 33 is released so that the spring 31 moves the handle to its ratchet-engaging position, shown in Figure 7. Thus the knob 7 may only be turned in the direction shown by the arrow to wind film, and the film can only be intermittently moved because the apertures 19 engage a stopping device, such as that shown in Figure 11. This stopping device may be released manually after each exposure, and after all the exposures are made, the film may continue to be wound by the winding knob, and the tape will automatically stop winding through the film-engaging lever 55, which releases the pawl 60 from the notched disk 38 allowing complete rewinding of film onto spool.

While I have described the preferred form of my invention and one by which the several objects of this invention are achieved and which is well adapted to meet the conditions of practical use, it is quite possible that other improvements may readily be made from the specific example set forth in the drawings and description. It is, therefore, to be understood that all matter contained in this application or shown in the accompanying drawings is to be interpreted as illustrative only, and not in a limiting sense.

Having thus described my invention, what I claim as new and desire to secure by Letters Patent of the United States is:

1. A film metering control for extrusion loading cameras comprising, in combination, a camera body having an exposure frame, a spool chamber on each side of the exposure frame, and a film winding post having a spool engaging configuration thereon, a winding knob on the post for turning a film spool, the film spool also having a configuration to be turned by the configuration of the post, a sheave mounted to turn on the post, a friction clutch between the sheave and post tending to turn the sheave by the post, a tape attached to the sheave and of the type tending to move into a coil, said tape including means for indexing exposure areas of film, mechanism for positively attaching the winding post and sheave, and a release for said mechanism under the control of the tape to release the mechanism for positively connecting the sheave and post after predetermined movement in unison of the post and sheave.

2. A film metering control for extrusion loading cameras comprising, in combination, a camera body having an exposure frame, a spool chamber on each side of the exposure frame, and a film winding post having a spool engaging configuration thereon, a winding knob on the post for turning a film spool also having a configuration to be turned by the configuration of the post, a sheave mounted to turn on the post, a friction clutch between the sheave and post tending to turn the sheave by the post, a tape attached to the shave and of the type tending to move into a coil, said tape including means for indexing exposure areas of film, mechanism for positively attaching the winding post and sheave, and a release for said mechanism under the control of the tape to release the mechanism for positively connecting the sheave and post after predetermined movement in unison of the post and sheave, the mechanism for positively attaching the sheave to the winding key post comprising a pawl and a notched disk, carried by the sheave and the winding key post.

3. A film metering control for extrusion loading cameras comprising, in combination, a camera body having an exposure frame, a spool chamber on each side of the exposure frame, and a film winding post having a spool engaging configuration thereon, a winding knob in the post for turning a film spool also having a configuration to be turned by the configuration of the post, a sheave mounted to turn on the post, a friction clutch between the sheave and post tending to turn the sheave by the post, a tape attached to the sheave and of the type tending to move into a coil, said tape including means for indexing exposure areas of film, mechanism for positively attaching the winding post and sheave, and a release for said mechanism under the control of the tape to release the mechanism for positively connecting the sheave and post after predetermined movement in unison of the post and sheave, the mechanism for positively attaching the sheave to the winding key post comprising a pawl and a notched disk, carried by the sheave and the winding key post, a spring normally engaging the pawl and notched disk, said pawl having an operating arm moveable to disconnect the pawl and notched disk, and a release lever carried by the camera and under the control of a film for unlatching the pawl and notch disk when film is removed from the path of the release lever.

4. A film metering control for extrusion loading cameras comprising, in combination, a camera body having an exposure frame, a spool chamber on each side of the exposure frame, and a film winding post having a spool engaging configuration thereon, a winding knob on the post for turning a film spool also having a configuration to be turned by the configuration of the post, a sheave mounted to turn on the post, a friction clutch between the sheave and post tending to turn the sheave by the post, a tape attached to the sheave and of the type tending to move into a coil, said tape including means for indexing exposure areas of film, mechanism for positively attaching the winding post and sheave, and a release for said mechanism under the control of the tape to release the mechanism for positively connecting the sheave and post after predetermined movement in unison of the post and sheave, the mechanism for positively attaching the sheave to the winding key post comprising a pawl and a notched disk, carried by the sheave and the winding key post, a spring normally engaging the pawl and notched disk, said pawl having an operating arm moveable to disconnect the pawl and notched disk, and a release lever carried by the camera and under the control of a film for unlatching the pawl and notch disk when film is removed from the path of the release lever, said release lever being operable to release the pawl through the pressure of a spring, and moveable against spring pressure when a film is moved in the camera into contact with the release lever.

5. A film metering control for extrusion loading cameras comprising, in combination, a camera body having an exposure frame, a spool chamber on each side of the exposure frame, and a film winding post having a spool engaging configuration thereon, a winding knob on the post for turning a film spool also having a configuration to be turned by the configuration of the post, a sheave mounted to turn on the post, a friction clutch between the sheave and post tending to turn the sheave by the post, a tape attached to the sheave and of the type tending to move into a coil, said tape including means for indexing exposure areas of film, mechanism for positively attaching the winding post and sheave, and the mechanism for positively attaching the winding post and sheave including a release lever spring pressed across the path of film moving through the camera to release the positive connection between the sheave and post when film is removed from the camera.

6. A film metering control for extrusion loading cameras comprising, in combination, a camera body having an exposure frame, a spool chamber on each side of the exposure frame, and a film winding post having a spool engaging configuration thereon, a winding knob on the post for turning a film spool also having a configuration to be turned by the configuration of the post, a sheave mounted to turn on the post, a friction clutch between the sheave and post tending to turn the sheave by the post, a tape attached to the sheave and of the type tending to move into a coil, said tape including means for indexing exposure areas of film, mechanism for attaching and disconnecting the sheave and post, said mechanism including a delay mechanism for connecting the post and sheave only after a predetermined movement of the post as it is turned by the winding knob whereby film may be moved in advance of movement of the tape.

7. A film metering control for extrusion loading cameras comprising, in combination, a camera body having an exposure frame, a spool chamber on each side of the exposure frame, and a film winding post having a spool engaging configuration on the post, a sheave mounted to turn on the post, a friction clutch between the sheave and post tending to turn the sheave by the post, a tape attached to the sheave and of the type tending to move into a coil, said tape including means for indexing exposure areas of film, mechanism for attaching and disconnecting the sheave and post, said mechanism including a delay mechanism for connecting the post and sheave only after a predetermined movement of the post as it is turned by the winding knob whereby film may be moved in advance of movement of the tape, the means for indexing exposure areas of film comprising designating characters on the tape and a window in the camera through which the characters may be viewed, and a stop carried by the tape for limiting winding movement of the tape in one direction.

8. A film metering control for extrusion loading cameras comprising, in combination, a camera body having an exposure frame, a spool chamber on each side of the exposure frame, and a film winding post having a spool engaging configuration of the post, a sheave mounted to turn on the post, a friction clutch between the sheave and post tending to turn the sheave by the post, a tape attached to the sheave and of the type tending to move into a coil, said tape including means for indexing exposure areas of film, mechanism for attaching and disconnecting the sheave and post, said mechanism including a delay mechanism for connecting the post and sheave only after a predetermined movement of the post as it is turned by the winding knob whereby film may be moved in advance of movement of the tape, the means for indexing exposure areas of film comprising designating characters on the tape and a window in the camera through which the characters may be viewed, and a stop carried by the tape for limiting winding movement of the tape in one direction, means for limiting winding movement in the other direction comprising a spring stop member normally held in an inactive position by convolutions of tape on the sheave.

9. A film metering control for extrusion loading cameras comprising, in combination, a camera body having an exposure frame, a spool chamber on each side of the exposure frame, and a film winding post having a spool engaging configuration of the post, a sheave mounted to turn on the post, a friction clutch between the sheave and post tending to turn the sheave by the post, a tape attached to the sheave and of the type tending to move into a coil, said tape including means for indexing exposure areas of film, mechanism for attaching and disconnecting the sheave and post, said mechanism including a delay mechanism for connecting the post and sheave only after a predetermined movement of the post as it is turned by the winding knob whereby film may be moved in advance of movement of the tape, the means for indexing exposure areas of film comprising designating characters on the tape and a window in the camera through which the characters may be viewed, and a stop carried by the tape for limiting winding movement of the tape in one direction, means for limiting winding movement in the other direction comprising a stop spring member normally held in an inactive position by convolutions of tape on the sheave, said spring rewind stop normally riding in an annular groove having an offset, said groove and offset being carried by a wall of the camera encircling the winding post, the rewind spring stop being adapted to move radially into said offset when no longer held inactive by convolutions of tape on the sheave.

10. A film metering control for extrusion loading cameras comprising, in combination, a camera body having an exposure frame, a spool chamber on each side of the exposure frame, and a film winding post having a spool engaging configuration thereon, a winding knob in the post for turning a film spool also having a configuration to be turned by the configuration of the post, a sheave mounted to turn on the post, a friction clutch between the sheave and post tending to turn the sheave by the post, a tape attached to the sheave and of the type tending to move into a coil, said tape including means for indexing exposure areas of film, mechanism for positively attaching and disconnecting the winding key post and sheave comprising a pawl pivotally mounted on the sheave and a rewind spring stop normally lying in a radial groove in a camera wall surround the key post, said wall including an offset, said rewind stop being normally held from the offset by convolutions of tape wound in the sheave, the spring stop moving radially to enter the offset when the tape is unwound from the sheave releasing the spring stop to halt the unwinding movement of the tape, and means in the tape coacting with the camera to halt winding movement of the sheave in a wind up direction.

11. A film metering control for extrusion loading cameras comprising, in combination, a camera body having an exposure frame, a spool chamber on each side of the exposure frame, and a film winding post having a spool engaging configuration thereon, a winding knob in the post for turning a film spool also having a configuration to be turned by the configuration of the post, a sheave mounted to turn on the post, a friction clutch between the sheave and post tending to turn the sheave by the post, a tape attached to the sheave and of the type tending to move into a coil, said tape including means for indexing exposure areas of film, mechanism for positively attaching and disconnecting the winding key post and sheave comprising a pawl pivotally mounted on the sheave, and a rewind spring stop normally lying in a radial groove in a camera wall surround the key post, said wall including an offset, said rewind stop being normally held from the offset by convolutions of tape wound on the sheave, the spring stop moving radially to enter the offset when the tape is unwound from the sheave releasing the spring stop to halt the unwinding movement of the tape, and means in the tape coacting with the camera to halt winding movement of the sheave in a winding direction, a lever adapted to ride on the film for releasing the pawl from the notched plate as the film is wound up on its spool carried by the winding post.

12. A film metering control for extrusion loading cameras comprising, in combination, a camera body having an exposure frame, a spool chamber on each side of the exposure frame, and a film winding post having a spool engaging configuration thereon, a winding knob in the post for turning a film spool also having a configuration to be turned by the configuration of the post, a sheave mounted to turn on the post, a friction clutch between the sheave and post tending to turn the sheave by the post, a tape attached to the sheave and of the type tending to move into a coil, said tape including means for indexing exposure areas of film, mechanism for positively attaching and disconnecting the winding key post and sheave comprising a pawl pivotally mounted on the sheave and a rewind spring stop normally held from the offset by convolutions of tape wound in the sheave, the spring stop moving radially to enter the offset when the tape is unwound from the sheave releasing the spring stop to halt the unwinding movement of the tape, and means on the tape coacting with the camera to halt winding movement of the sheave in a windup direction, a lever adapted to ride on the film for releasing the pawl from the notched plate as the film is wound up on its spool carried by the winding post, thereby releasing the positive connection between the sheave and key post, the said friction clutch comprising a dished spring washer, the washer lying between a snap ring on the winding post and the sheave.

13. A film metering control for extrusion loading cameras comprising, in combination, a camera body having an exposure frame, a spool chamber on each side of the exposure frame, and a film winding post having a spool engaging configuration thereon, a winding knob in the post for turning a film spool also having a configuration to be turned by the configuration of the post, a sheave mounted to turn on the post, a friction clutch between the sheave and post tending to turn the sheave by the post, a tape attached to the sheave and of the type tending to move into a coil, said tape including means for indexing exposure areas of film, mechanism for positively attaching and disconnecting the winding key post and sheave comprising a pawl pivotally mounted on the sheave, a groove having an offset in the camera body adjacent the film-winding post and a rewind spring stop normally held from the offset by convolutions of tape wound in the sheave, the spring stop moving radially to enter the offset when the tape is unwound from the sheave releasing the spring stop to halt the unwinding movement of the tape, and means in the tape coacting with the camera to halt winding movement of the sheave in a wind-up direction, a lever adapted to ride on the film for releasing the pawl from the notched plate as the film is wound up on its spool carried by the winding post, thereby releasing the positive connection between the sheave and key post, the said friction clutch comprising a dished spring washer, the washer lying between a snap ring on the winding post and a washer surrounding the winding key post and lying adjacent to the sheave, the washer and sheave having a lost-motion connection comprising a lug and slot between them.

14. A film metering control for extrusion loading cameras, comprising, in combination, a camera body having an exposure frame, a spool chamber on each side of the exposure frame, and a film winding post having a winding knob outside of the camera body and a configuration for drivingly engaging a film spool inside a spool chamber for moving film back and forth between the spool chambers, a flexible metal tape of a type adapted to move into a coil extending across the exposure frame and into a loose coil, an axially slotted sheave mounted on the film winding post, a friction clutch tending to turn the sheave with the post, a notched washer mounted to turn with the post, a pawl carried in the axial slot in the sheave to move therein from a position to engage a notch in the notched washer to positively drive the sheave from the post to a position out of engagement with the notched washer wherein the sheave may tend to move with the post through the friction clutch, and means for preventing side pressure by the pawl against a notch comprising a friction washer having a lost motion lug and slot connection with the sheave for furnishing an element of the slip clutch tending to turn the sheave from the post when the pawl is released from the notched disk.

15. A film metering control for extrusion loading cameras comprising in combination a camera body having an exposure frame, a spool chamber on each side of the exposure frame and a film winding post having a winding knob outside of the camera body, a configuration for drivingly engaging a film spool inside a spool chamber for moving film back and forth between the spool chambers, a flexible metal tape of the type adapted to move into a coil extending across the exposure frame and into a loose coil, an axially slotted sheave mounted on the film winding post, a friction clutch tending to turn the sheave with the post, a notched washer mounted to turn with the post, a pawl carried in the axial slot in the sheave to move therein from a position to engage a notch in the notched washer to positively drive the sheave from the post to a position out of engagement with the notched washer wherein the sheave may tend to move with the post through the friction clutch, and means for preventing side pressure by the pawl against a notch comprising a friction washer having a lost motion lug and a slot connection with the sheave for furnishing an element of the slip clutch tending to turn the sheave from the post when the pawl is released from the notched disk and a spring actuated contacting member carried by the sheave and engaging a slot including an offset in the camera body for holding the sheave against movement in one direction when convolutions of the spring tape are unwound from the sheave, and the spring actuated contacting member engages the offset in the camera groove.

HERBERT A. BING.

No references cited.